(12) United States Patent
Nagahiro

(10) Patent No.: US 10,120,636 B2
(45) Date of Patent: Nov. 6, 2018

(54) DISPLAY CONTROL DEVICE AND DISPLAY CONTROL METHOD FOR DISPLAYING CONTENT ON MULTIPLE DISPLAY SCREENS

(71) Applicant: SONY CORPORATION, Tokyo (JP)

(72) Inventor: Koji Nagahiro, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/646,111

(22) PCT Filed: Oct. 24, 2013

(86) PCT No.: PCT/JP2013/006318
§ 371 (c)(1),
(2) Date: May 20, 2015

(87) PCT Pub. No.: WO2014/097523
PCT Pub. Date: Jun. 26, 2014

(65) Prior Publication Data
US 2015/0301785 A1    Oct. 22, 2015

(30) Foreign Application Priority Data
Dec. 18, 2012    (JP) .................................. 2012-275539

(51) Int. Cl.
*G06F 3/14*    (2006.01)
*G06T 3/40*    (2006.01)

(52) U.S. Cl.
CPC .............. *G06F 3/1454* (2013.01); *G06T 3/40* (2013.01); *G09G 2340/145* (2013.01); *H04M 2250/16* (2013.01)

(58) Field of Classification Search
None
See application file for complete search history.

(56) References Cited

U.S. PATENT DOCUMENTS

2006/0085753 A1    4/2006    Vance et al.
2012/0306737 A1    12/2012   Sweet

FOREIGN PATENT DOCUMENTS

| JP | 2000-003241 A | 1/2000 |
| JP | 2005-335555 A | 12/2005 |
| JP | 2008-027009 A | 2/2008 |
| JP | 2008517525 A | 5/2008 |
| JP | 2012-003551 A | 1/2012 |
| JP | 2012-208645 A | 10/2012 |

OTHER PUBLICATIONS

Office Action Received for Japanese Patent Application No. 2012-275539 dated Dec. 1, 2015.
Office Action received for European Patent application No. 13791861.1, dated Jun. 14, 2016, 9 pages of office action.
Office Action for CN Patent Application No. 201380064185.6, dated May 3, 2017, 9 pages of Office Action and 15 pages of English Translation.

*Primary Examiner* — David D Davis
(74) *Attorney, Agent, or Firm* — Chip Law Group

(57) ABSTRACT

A display control device includes a control device to control display of a first object on a first display screen and a second object on a second display screen. The second object on the second display screen corresponds to the first object on the first display screen, and is at a different level in a hierarchy from the first object on the first display screen.

19 Claims, 11 Drawing Sheets

[Fig. 1]
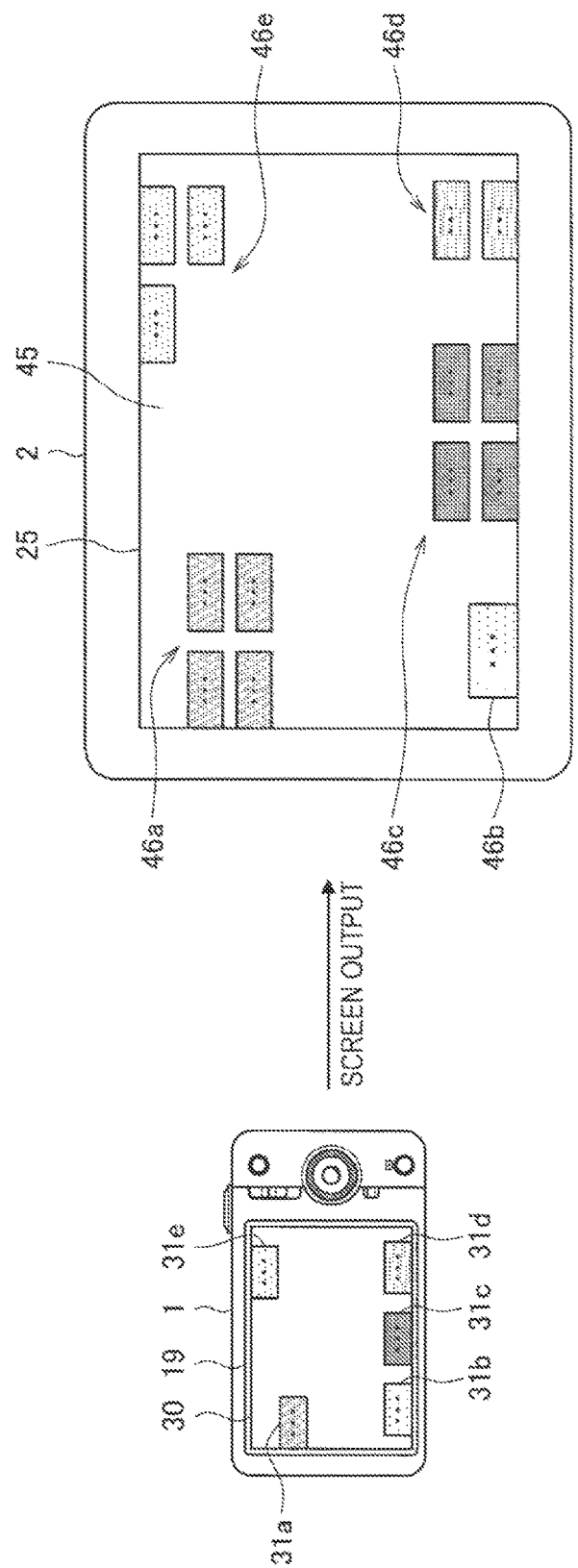

[Fig. 2]
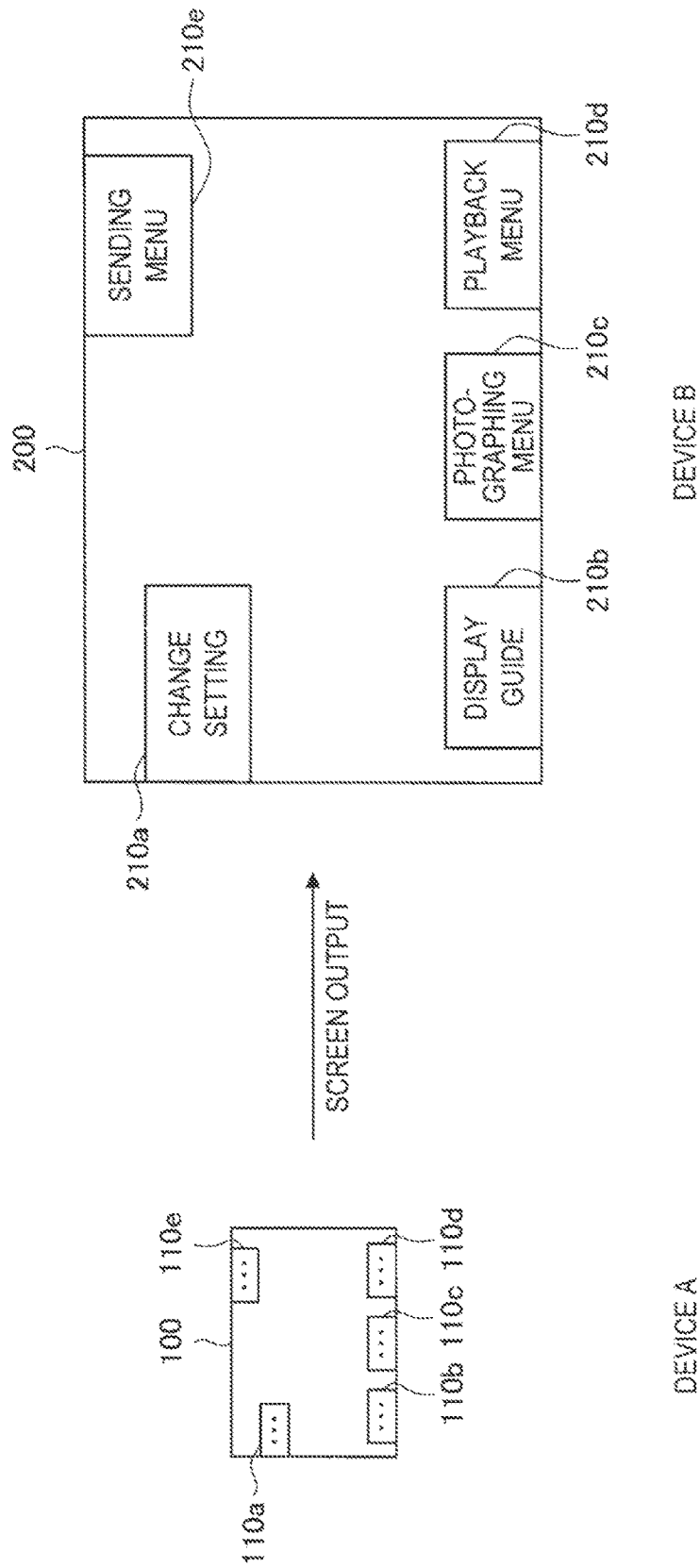

[Fig. 3]
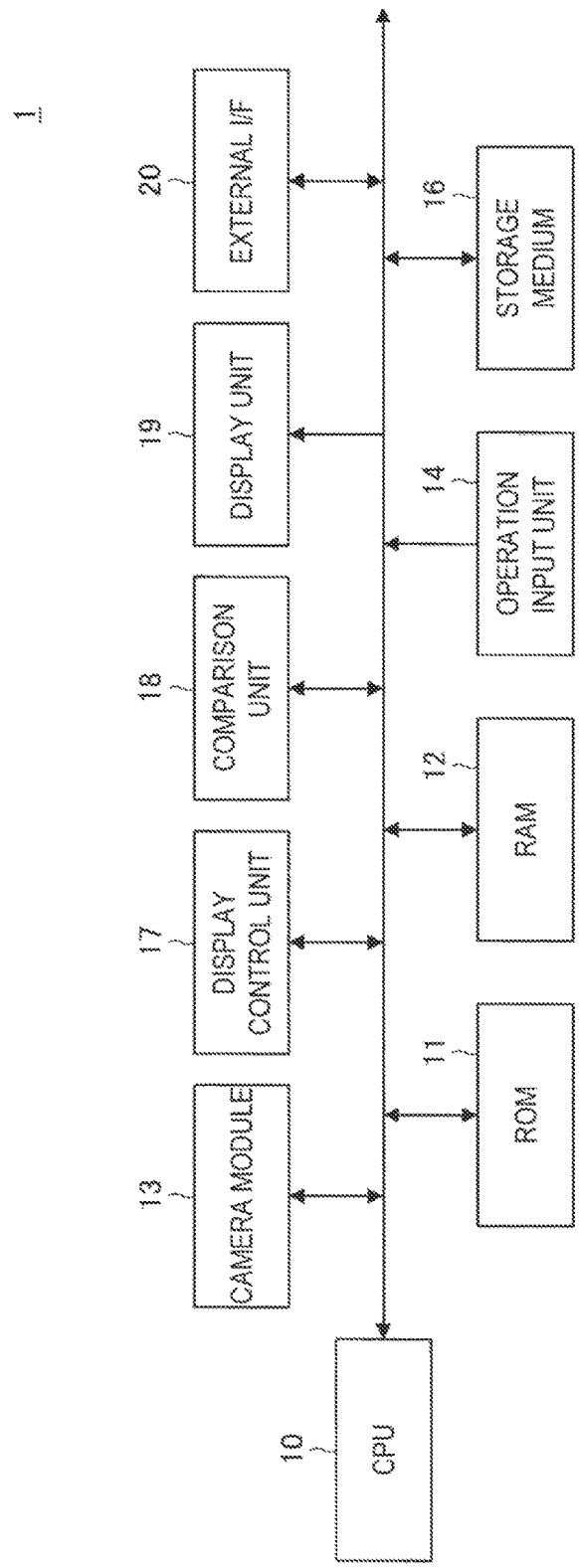

[Fig. 4]
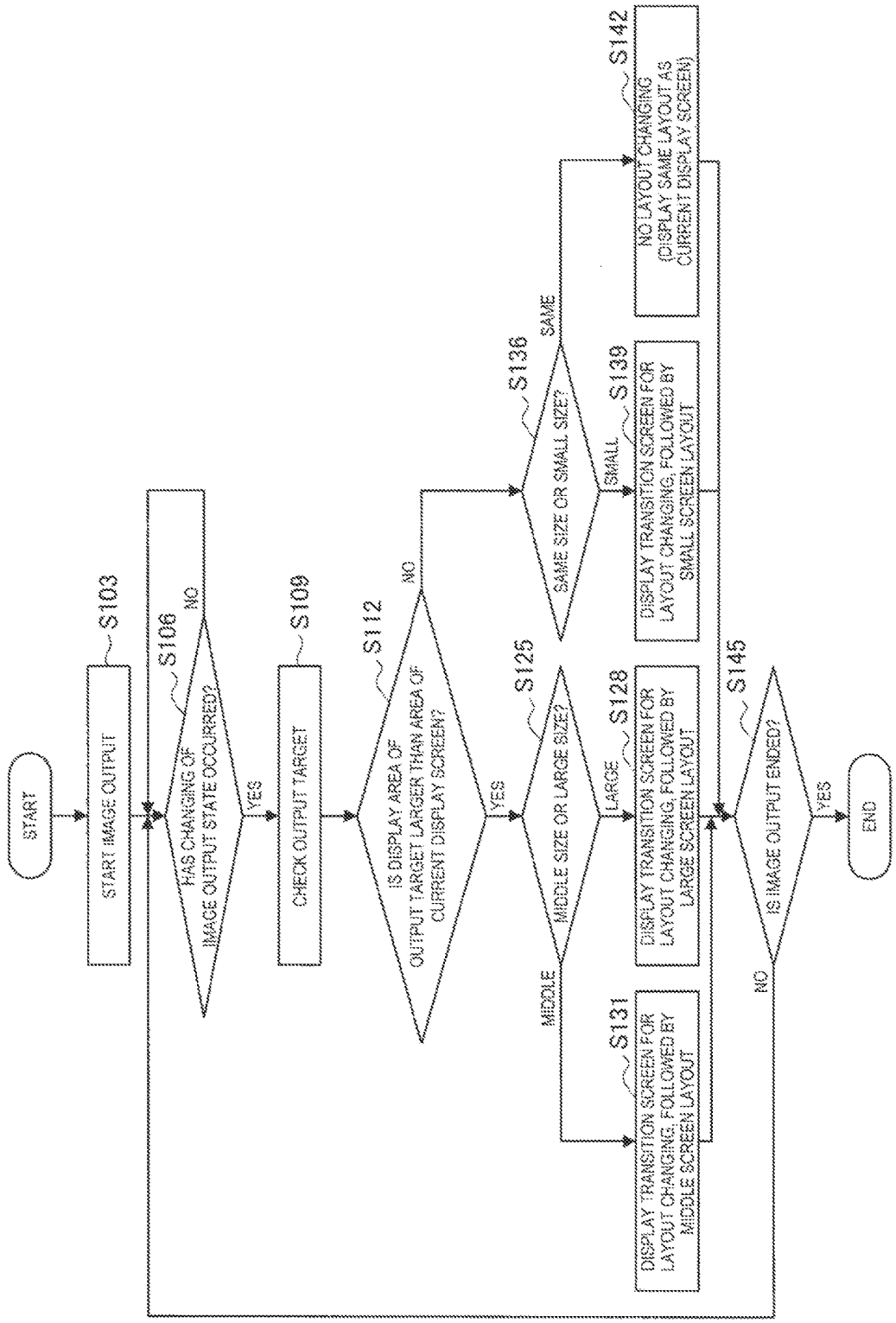

[Fig. 5]
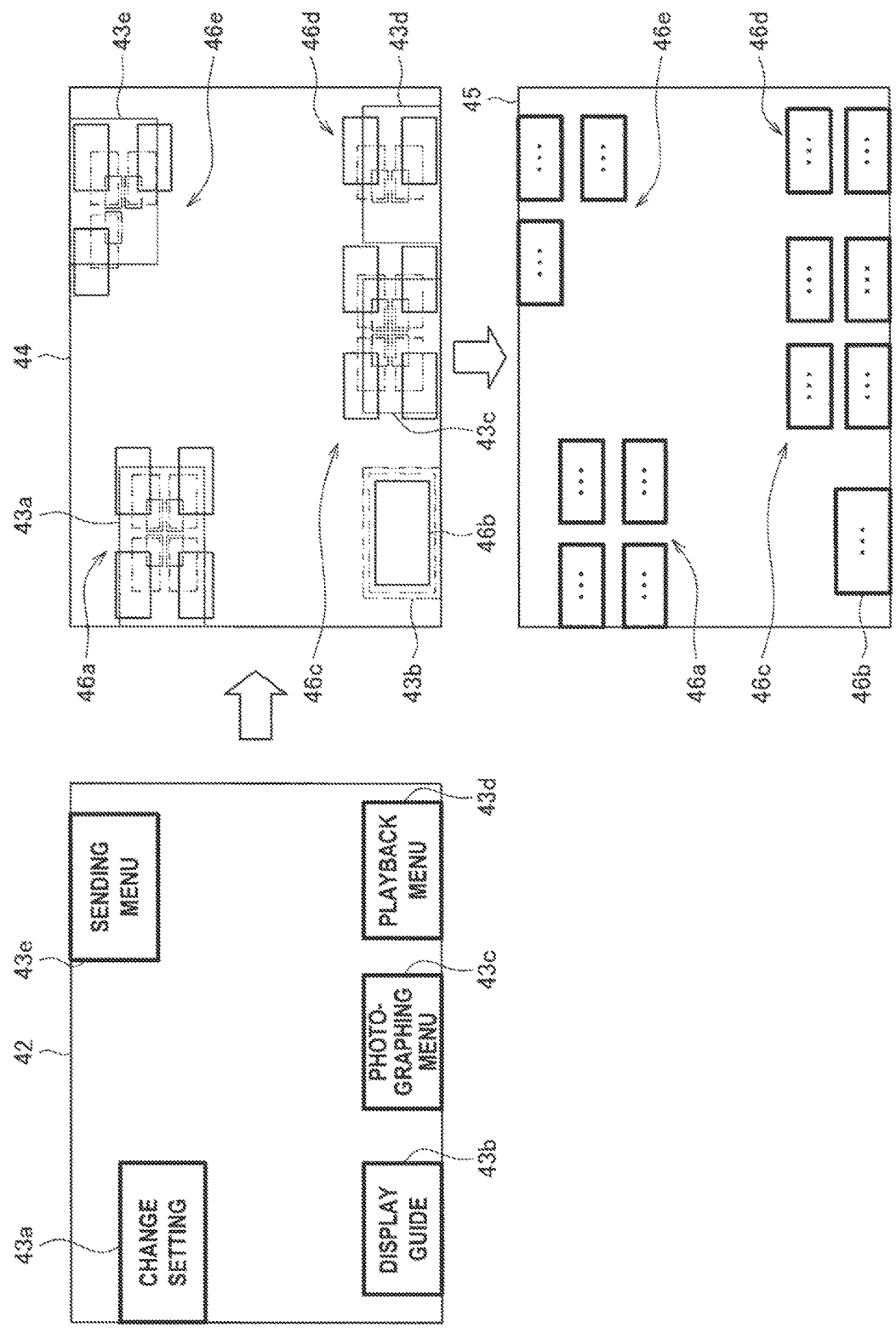

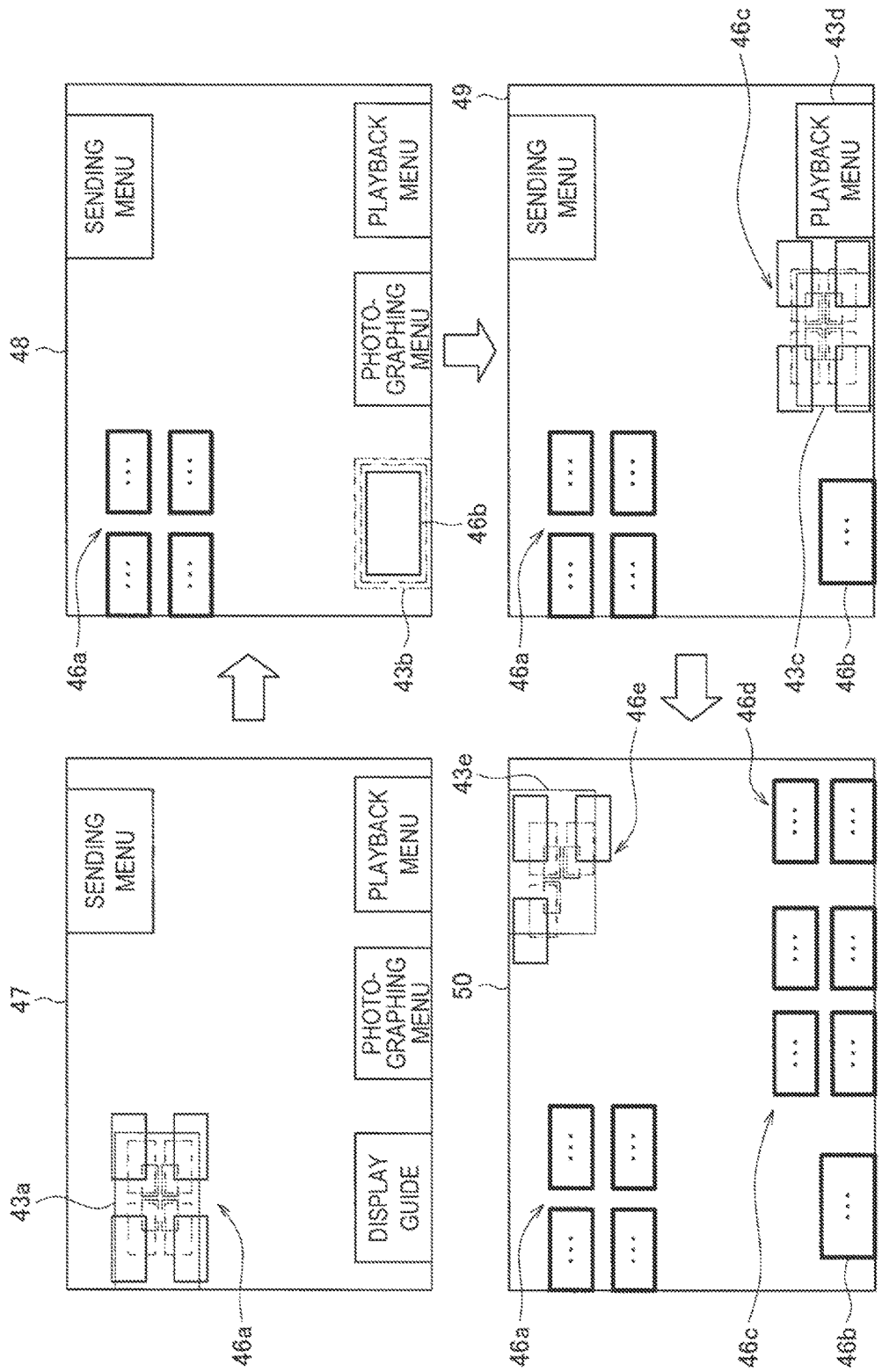

[Fig. 7]
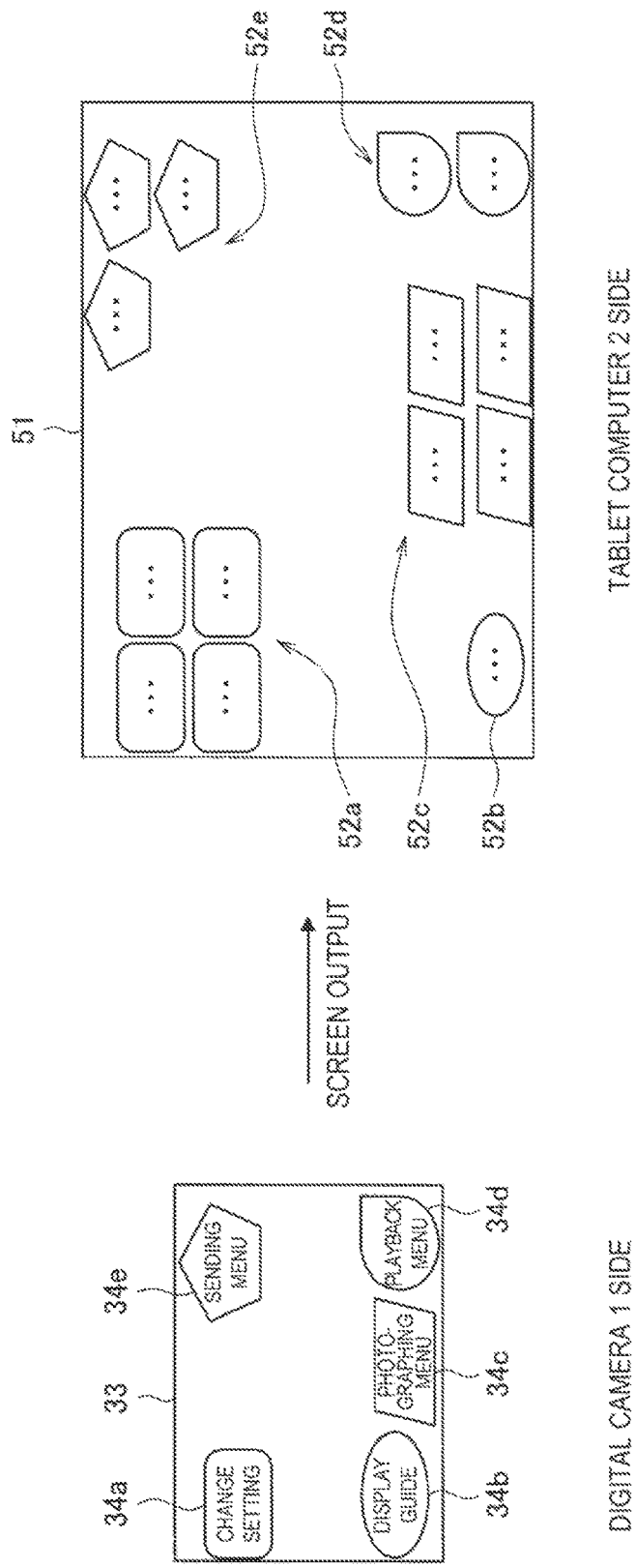

[Fig. 8]
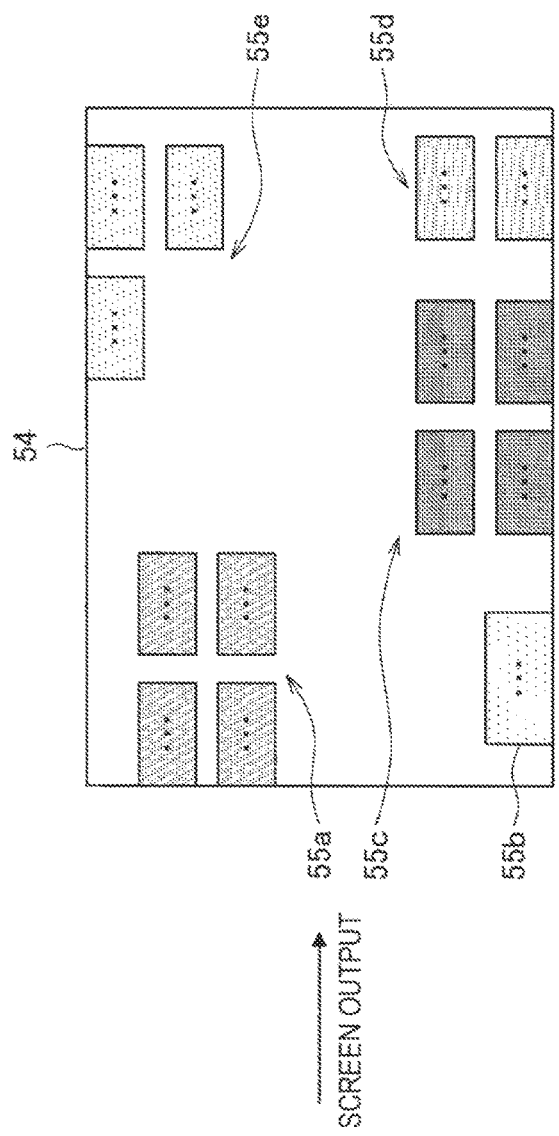
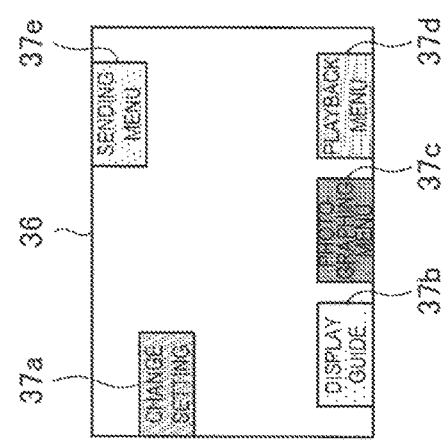

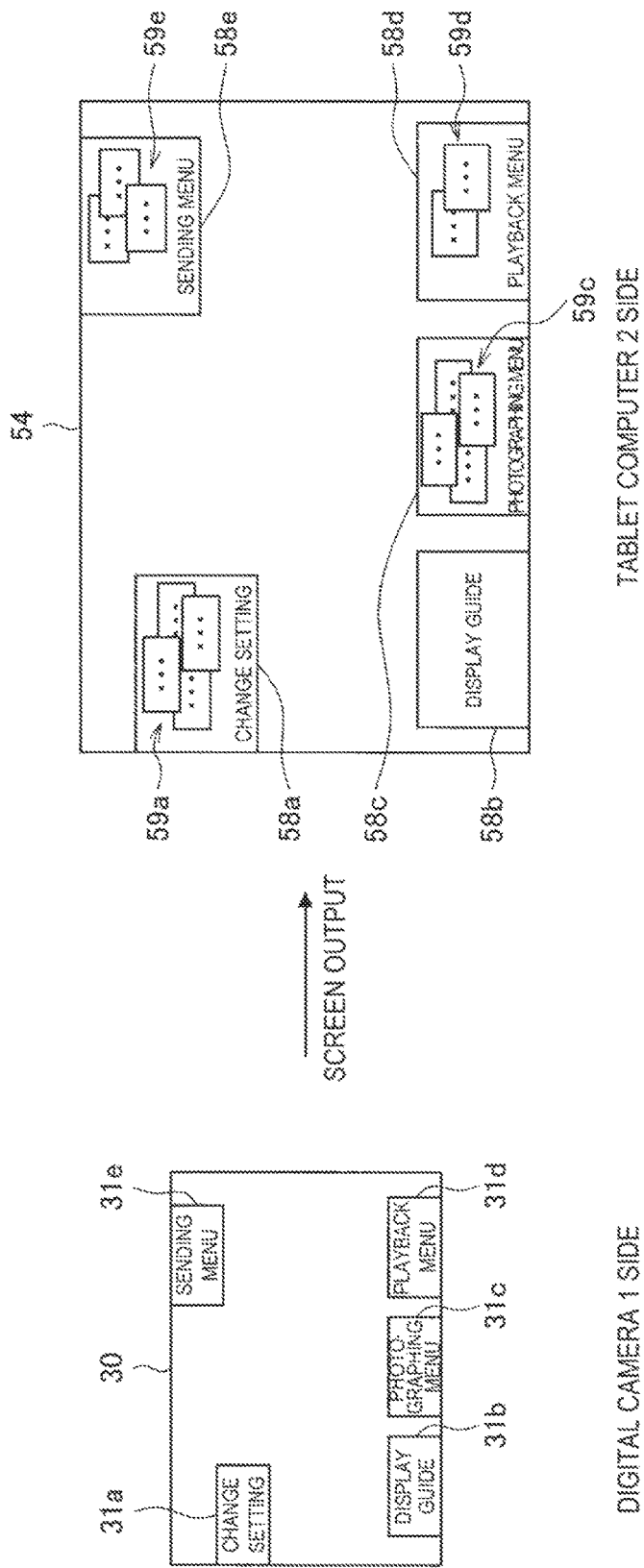

[Fig. 10]
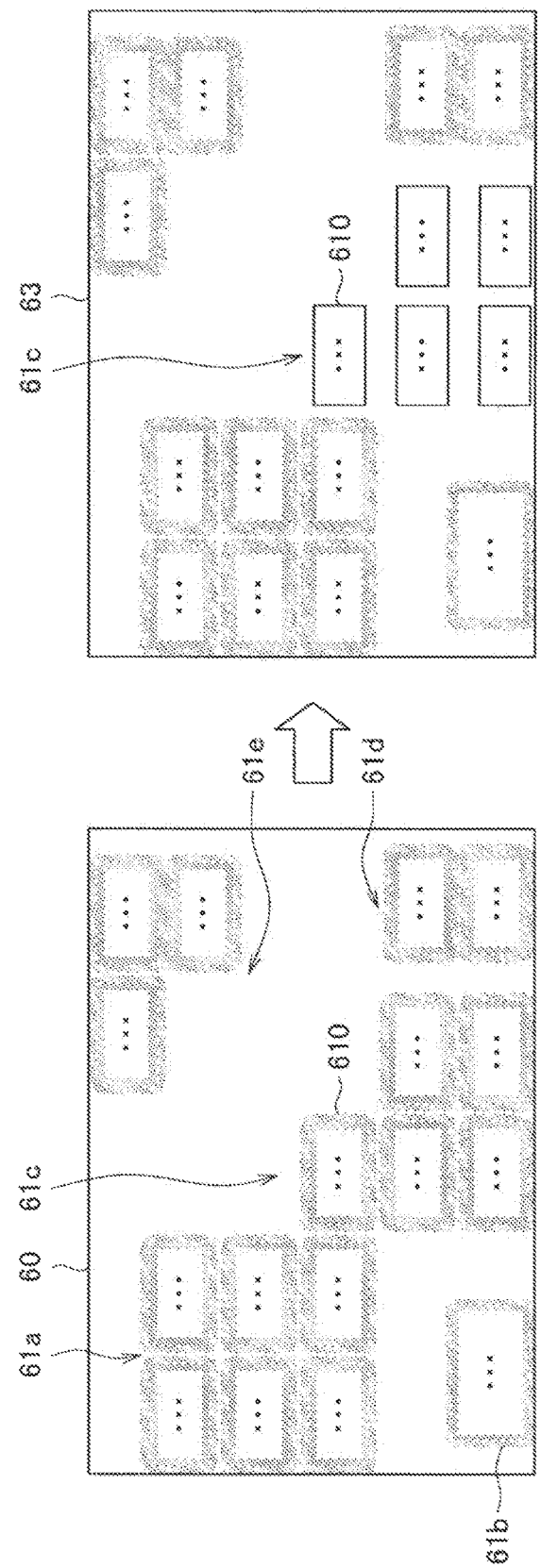

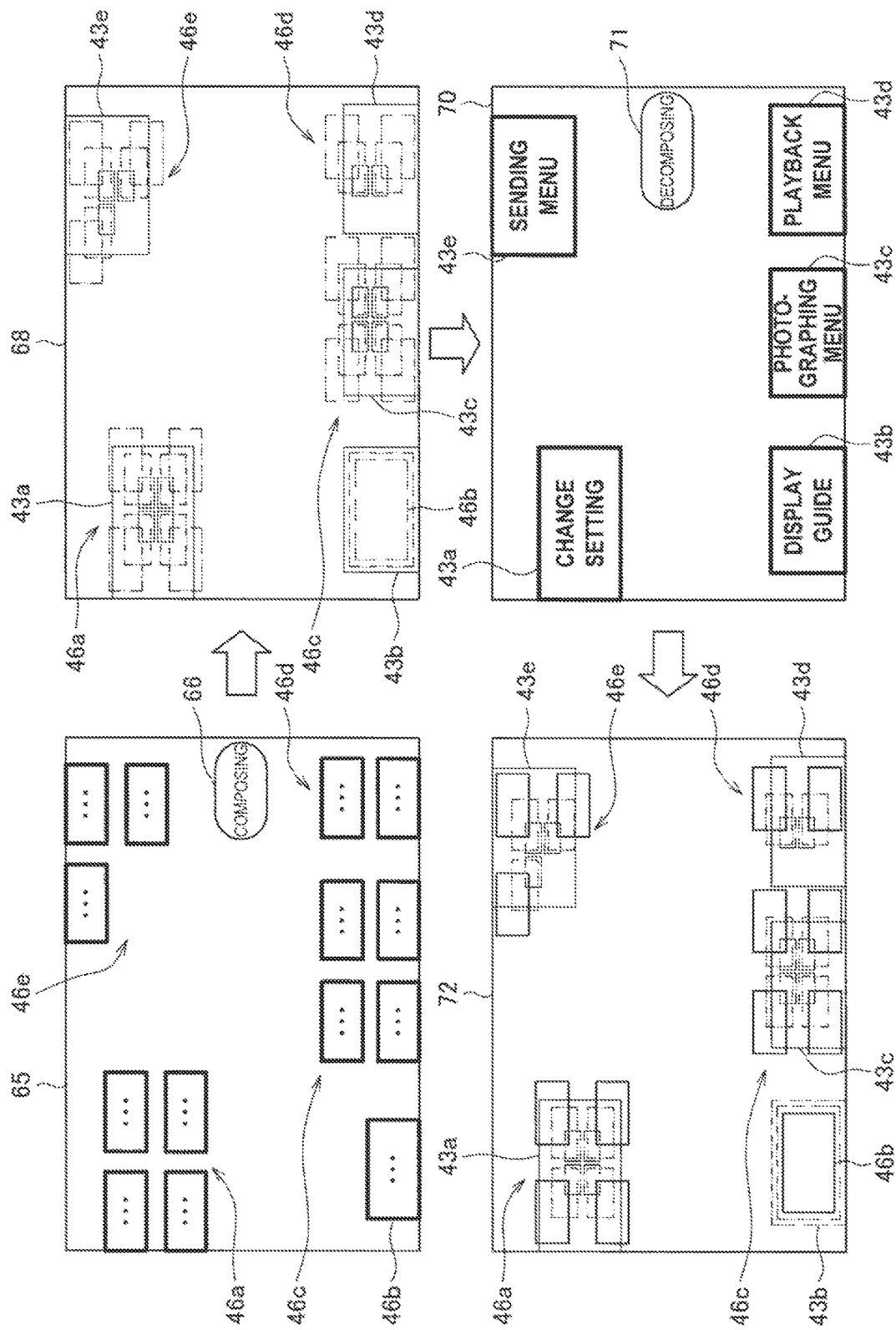

DISPLAY CONTROL DEVICE AND DISPLAY CONTROL METHOD FOR DISPLAYING CONTENT ON MULTIPLE DISPLAY SCREENS

CROSS-REFERENCE TO RELATED APPLICATIONS

The present application claims priority from JP 2012-275539 filed Dec. 18, 2012 in the Japanese. Patent Office, the entire content of which is hereby incorporated herein by reference.

TECHNICAL FIELD

The present disclosure relates to a display control device, a display control method, and a program.

BACKGROUND ART

Typically, a layout of a display screen in an information processing device, such as a personal computer (PC), a tablet computer, a mobile phone, a smart phone, a digital camera and a digital video camera, is controlled depending on reference values that are previously set. For example, the sizes and arrangement of icons contained in a menu screen or each operation screen depend on reference values that are previously set, and the icons are arranged in predetermined sizes at predetermined positions.

For example, when the size of the entire display area is changed, a title bar, a menu bar and the like unfortunately become larger, and further the menu bar exceeds the horizontal size of a window and becomes difficult to select. Responding to this, the following Patent Literature 1 discloses a renewing system that during execution of a program, receives a notice for a window screen changing, calculates the display area automatically, and revises the horizontal size of a menu bar or the size of a title bar depending a screen size with a new setting.

CITATION LIST

Patent Literature

PTL 1: JP 2001-242976A

SUMMARY

Technical Problem

However, the above Patent Literature 1 mentions that the display sizes of the title bar and menu are changed into the optimal sizes in response to the changing in the size of the entire display area, but does not mention that the amount of the information to be displayed is changed.

In recent years, there has been seen a utility form in which an information processing device having a display function is connected with an external display device so that a display screen of the information processing device is output to the external display device. However, the display target, in which the display size is merely changed in accordance with the screen size thereof, is often difficult to use.

Hence, in the embodiment of the present disclosure, there are proposed a novel and improved display control device, display control method and program that allow for a changing in the degree of detail of the information contained in a display screen to be externally output.

Solution to Problem

According to an embodiment of the present disclosure, a display control device may include a control device to control display of an object on a first display screen and an object on a second display screen, wherein the object on the second display screen corresponds to the object on the first display screen, and wherein the object on the second display screen is at a different level in a hierarchy from the Object on the first display screen.

According to an embodiment of the present disclosure, a display control method may include controlling, by a processor, display of an object on a first display screen and an object on a second display screen, wherein the object on the second display screen corresponds to the object on the first display screen, and wherein the object on the second display screen is at a different level in a hierarchy from the object on the first display screen.

According to an embodiment of the present disclosure, a non-transitory recording medium may be recorded with a program executable by a computer, and the program may include controlling display of an object on a first display screen and an object on a second display screen, wherein the object on the second display screen corresponds to the Object on the first display screen, and wherein the object on the second display screen is at a different level in a hierarchy from the object on the first display screen.

Advantageous Effects of Invention

As explained above, in accordance with embodiments of the present disclosure, the degree of detail of the information contained in a display screen to be externally output can be changed.

BRIEF DESCRIPTION OF DRAWINGS

FIG. 1 is an explanatory diagram for summary of display control according to an embodiment of the present disclosure.

FIG. 2 is an explanatory diagram for a case where a display screen is displayed in an enlarged size on an output target.

FIG. 3 is a block diagram showing an exemplary internal configuration of a digital camera 1 according to the embodiment.

FIG. 4 is a flowchart showing a display control processing according to the embodiment.

FIG. 5 is a transition diagram for explaining a first exemplary screen display according to the embodiment.

FIG. 6 is a transition diagram for explaining a second exemplary screen display according to the embodiment.

FIG. 7 is a diagram for explaining a third exemplary screen display according to the embodiment.

FIG. 8 is a diagram for explaining a fourth exemplary screen display according to the embodiment.

FIG. 9 is a diagram for explaining a fifth exemplary screen display according to the embodiment.

FIG. 10 is a transition diagram for explaining a sixth exemplary screen display according to the embodiment.

FIG. 11 is a transition diagram for explaining a seventh exemplary screen display according to the embodiment.

DESCRIPTION OF EMBODIMENTS

Preferred embodiments of the present disclosure will be described in detail below with reference to the accompanying drawings. Here, in the description and drawings, as for components having a substantially identical function and configuration, an identical reference sign is assigned, and thereby, repetitive explanations therefor are omitted.

Explanations will be made in the following order.
1. Summary of display control according to an embodiment of the present disclosure
2. Basic configuration and behavior processing
2-1. Digital camera configuration
2-2. Display control processing
3. Exemplary screen displays
3-1. First exemplary screen display
3-2. Second exemplary screen display
3-3. Third exemplary screen display
3-4. Fourth exemplary screen display
3-5. Fifth exemplary screen display
3-6. Sixth exemplary screen display
3-7. Seventh exemplary screen display
4. Conclusion <<1. Summary of Display Control According to an Embodiment of the Present Disclosure>>

First, a summary of display control according to an embodiment of the present disclosure will be explained with reference to FIG. 1.

FIG. 1 is an explanatory diagram for a summary of display control according to an embodiment of the present disclosure. As shown in FIG. 1, a digital camera 1 (display control device) according to the embodiment includes a display unit 19 and displays, for example, a menu screen 30 on the display unit 19. The menu screen 30 contains menu item 31a, 31b, 31c, 31d and 31e, each of which is arranged in a previously set size at a predetermined position.

The digital camera 1 has a function to output a display screen to an external display device. The external display device is, for example, a tablet computer 2 as shown in FIG. 1, and other examples include a smart phone, a digital video camera, a notebook PC, a television device and a projector.

Typically, when the display area of the output target is larger than the display area of the digital camera 1 that is an output source, a display screen of the output source is simply enlarged in size and displayed on the output target. Concrete explanations will be made below with reference to FIG. 2.

FIG. 2 is an explanatory diagram for a case where a display screen is displayed in an enlarged size on an output target. As shown in FIG. 2, for example, in the case where a display screen 100 is displayed on a device A, the sizes and arrangement of items 110a to 110e contained in the display screen 100 are sizes and an arrangement that are previously set to be easy for users to use depending on the display area of the device A.

Then, when this display screen 100 is output to a device B whose display area is larger than the display area of the device A, as shown in FIG. 2, a display screen 200 to which the display screen 100 is enlarged in accordance with the display area of the device B is displayed on the device B. Thereby, items 210a to 210e contained in the display screen 200 are also displayed in enlarged sizes. Since the items 210a to 210e are displayed largely more than necessary, they are difficult for users to use. Furthermore, displaying larger items than necessary may be a waste of the display area.

In view of the above-described circumstances, in the display control according to the embodiment of the present disclosure, the size of each object (for example, icon) contained in a display screen is adjusted depending on the display area of an output target, and further a display is changed so as to provide more detailed information depending on the display area of the output target. That is, screens to be displayed on the digital camera 1 shown in FIG. 1 are hierarchically classified in order that display contents are effectively recognized even on a small screen, and the menu screen 30 is the initial screen on which the topmost class is only displayed. Since the digital camera 1 displays the subclass in response to a selection by users, users can get to their intended functions by repeating the selection.

In the case where the menu screen 30 is output to an external larger display area, if it is possible to change the screen into a display screen in which the larger display area is effectively utilized, the convenience of the user interface (UI) increases drastically. Concretely, in the display control according to the embodiment of the present disclosure, by changing the display so as to increase the amount of the information contained in the initial screen, users can get to their intended functions directly or by fewer selecting operations.

For example, as shown in FIG. 1, when outputting the menu screen 30 to the tablet computer 2 that has a larger display area than the display area of the digital camera 1, the digital camera 1 may change the menu screen 30 into a menu screen 45 containing multiple classes of functions and increase the amount of the information contained in the initial screen. As shown in FIG. 1, the menu screen 45, which is displayed on a display unit 25 of the tablet computer, contains icon groups 46a, 46c, 46d and 46e. These icon groups 46a, 46c, 46d and 46e indicate subclass functions of the menu items 31a, 31c, 31d and 31e, respectively. Concretely, for example, if the menu item 31a is "Change Setting," functions such as "Date and Time Setting", "Language Setting", "Screen Brightness Setting" and "System Setting" are displayed as the icon group 46a. If the menu item 31c is "Photographing Menu," functions such as "ISO Speed Setting," "Color Space," "Noise Reduction" and "Exposure" are displayed as the icon group 46c. If the menu item 31d is "Playback Menu," functions such as "Play All" and. "Display Calendar" are displayed as the icon group 46d, If the menu item 31e is "Sending Menu," functions such as "Send All", "Send Selection" and "Communication Method Setting" are displayed as the icon group 46e. An icon 46b that is contained in the display screen 45 is an example in the case where the menu item 31b has no subclass and is displayed with holding the same class (initial class). As shown in FIG. 1, the icon is adjusted only in size to be displayed. For example, there is a possibility that the menu item 31b is "Display Guide" and has no subclass.

Thus, the menu screen 45 displayed on the tablet computer 2 contains multiple classes of functions in the initial screen, and users can get to their intended functions directly or by fewer selecting operations.

In the embodiment, the icon groups 46a, 46c, 46d and 46e, and icon 46b contained in the menu screen 45 are each displayed at positions corresponding to the menu items 31a to 31e contained in the menu screen 30 of the output source, in order to show the association with the menu items 31a to 31e.

So far, the summary of the display control according to the embodiment of the present disclosure has been explained. Next, the configuration and behavior processing of the digital camera 1 (display control device) that executes the display control according to the embodiment of the present disclosure, will be explained in order. Here, FIG. 1 shows the digital camera 1 as an example of the display control device according to the embodiment. Alternatively, the display control device according to the embodiment is not limited to these, and may be a digital video camera, a mobile phone, a personal handy-phone system (PHS), a smart phone, a personal digital assistant (PDA), a notebook PC, or the like.

<<2. Basic Configuration and Behavior Processing>>

<2-1. Digital Camera Configuration>FIG. 3 is a block diagram showing an exemplary internal configuration of the digital camera 1 according to the embodiment. As shown in FIG. 3, the digital camera 1 according to the embodiment includes a central processing unit (CPU) 10, a read only memory (ROM) 11, a random access memory (RAM) 12, a camera module 13, an operation input unit 14, a storage unit, a storage medium 16, a display control unit 17, a comparison unit 18, a display unit 19 and an external interface (I/F) 20. The components will be concretely explained below.

(Camera Module)

The camera module 13 includes an optical system with an imaging element and imaging lens and a photograph-image-signal processing unit, and outputs photograph image data. that are digital signals. Here, the imaging element is implemented in, for example, a charge coupled device (CCD) imager or a complementary metal oxide semiconductor (CMOS) imager.

(Operation Input Unit)

The operation input unit 14 has a function to receive an operation input by users. Concretely, the operation input unit 14 is, for example, a power switch, a photographing instruction unit, an operation button and the like. The photographing instruction unit, through which users instruct a photographing processing by the camera module 13, may be a shatter button, for example. The operation input unit 14 may be a position-detectable touch panel in which the operation input unit 14 is integrated with the display unit 19.

(Storage Medium)

The storage medium 16 is an image storage unit that holds photographed storage data, and is implemented in, for example, a flash memory such as a card-type memory, or a recording medium such as a digital versatile disc (DVD). The storage medium 16 may hold photograph images serially output from the camera module 13 as still image data (photographs) in response to timings of shatter button operations, or may hold them as motion image data (a video).

(Display Control Unit)

The display control unit 17 has a function to control a content to be displayed on the display unit 19 according to an instruction from the CPU 10. Concretely, the display control unit 17 performs control to display a predetermined menu screen or operation screen on the display unit 19, to display in real time a photograph image output from the camera module 13, and to display (play back) image data (still image/motion image) stored in the storage medium 16.

The display control unit 17 according to the embodiment can also control a display screen to be externally output from the external I/F 20. On this occasion, the display control unit 17 controls each of objects such as menu items and icons, which is contained in the display screen to be externally output, so as to change the object into a first display mode of a current object contained in a current display screen and a second display mode that differs from the first display mode in the degree of detail of information. For example, in the case where the display area of the output target is larger than the area of the current display screen, the display control unit 17 changes the object contained in the display screen to be externally output into the second mode that shows more detailed information (has a higher degree of detail of information) than the information that is shown by the current object contained in the current display screen.

More concretely, for example, the menu screen 30 shown in FIG. 1 is the current display screen on which each object is displayed in the first display mode, and the menu screen 45 is the display screen on which each object is displayed in the second display mode. As shown in FIG. 1, the display area of the tablet computer 2 that is the output target is larger than the display area of the digital camera I that displays the current display screen. Accordingly, the display control unit 17 performs such control that the menu screen to be output to the tablet computer 2 is changed into the initial screen that contains multiple classes as the second display mode showing detailed information.

Here, whether or not the display area of the output target is larger than the area of the current display screen is judged based on a comparison result output from the comparison unit 18, which will be explained next. In the description, the area of the current display screen means the display area of a display screen that is currently displayed and controlled by the display control unit 17. For example, if the display screen is currently output to a certain external display device, the display area of the certain external display device is applicable. Then, when the display target (output target) is switched to an alternate external display device or the display unit 19 of the digital camera 1, the display control unit 17 performs a changing of the display mode based on a size comparison between the display area of the certain external display device and the display area of the above alternate display device or the display area of the digital camera 1.

(Comparison Unit)

The comparison unit 118 has a function to compare the display area size of the output target of the display screen and the size of the current display screen. Concretely, the comparison unit 18 acquires the information about the display area from the display device, which is the output target, through the external I/F 20, and compares the size of the display area of the output target and the size of the current display screen.

(Display Unit)

The display unit 19 is controlled by the display control unit 17, and thereby displays (play back) a predetermined menu screen and operation screen, photograph images, and the like. The display unit 19 is implemented in, for example, a liquid crystal display (LCD), an organic light-emitting diode (OLED), or the like.

(External I/F)

The external I/F 20 has functions as an output unit to output data to an external device and as an input unit to receive data from the external device and input the data to the digital camera 1. The external I/F 20 according to the embodiment can input and output data by wired or wireless communication to the external device. For the wireless communication, a communication method such as wireless LAN, infrared rays, Wi-Fi, Bluetooth (R), near filed communication, or the like is used.

(CPU)

The CPU 10 is a control unit that controls each component of the digital camera 1. The above-described display control unit 17 and comparison unit 18 may be included in the CPU 10 as specific functions of the CPU 10.

(ROM, RAM)

The ROM 11 stores programs for the CPU 10 to execute each processing, and the like. The RAM 12 is used as a work area, when the CPU 10 executes the programs stored in the ROM 11.

So far, the configuration of the digital camera 1 according to the embodiment has been explained in detail. Next, the behavior processing of the digital camera 1 according to the embodiment will be explained with reference to FIG. 4.

<2-2. Display Control Processing>

FIG. 4 is a flowchart showing a display control processing according to the embodiment. As shown in FIG. 4, firstly, in step S103, the display control unit 17 of the digital camera 1 starts an image output to the display unit 19 in response to an instruction of the CPU 10. For example, when the power switch of the digital camera 1 is turned on, the display control unit 17 displays the menu screen 30 on the display unit 19, as shown in FIG. 1.

Next, in step S106, the CPU 10 of the digital cameral detects whether or not a changing of the image output state has occurred. The changing of the image output state concretely means a changing of the output target (display target) of images. For example, when a changing of the output target has been instructed by a user operation, or when the external I/F 20 has been connected to an external display device, the CPU 10 detects the changing of the output target.

Subsequently, in the case where a changing of the image output state has occurred (S106/Yes), the CPU 10 checks the output target in step S109. Concretely, the CPU 10 performs an information request to the output target of images, and acquires the information about the output target. Then, the CPU 10 outputs the information about the size of the display area of the output target to the comparison unit 18. Here, in the case where it is difficult to acquire the information about the output target from the output target, the CPU 10 may request users to input the information about the output target, and acquire the desired information.

Next, in step S112, the comparison unit 18 compares the size of the area of the current display screen and the size of the display area of the output target, and outputs the comparison result to the display control unit 17. Then, based on the comparison result, the display control unit 17 performs such control as to change the display mode of each object contained in a display screen to be output. In the following, concrete explanations will be made in steps S125 to S142.

First, in the case where the display area of the output target is larger than the area of the current display area (S112/Yes), the display control unit 17 judges whether the display area of the output target is a middle size or a large size, in step S125. Whether to be a middle size or a large size may be judged by which of a previously set middle size (for example, size from a first threshold value to a second threshold value) and large size (for example, size exceeding the second threshold value) is applicable.

Subsequently, in the case of a large size (S125/Large), the display control unit 17, in step S128, changes each object contained in the display screen to be output into a layout for a large screen, in other words, a display mode for a large screen. On this occasion, the display control unit 17 may perform such control as to display on the output target a transition screen (animation) that shows the changing of the display mode of each object contained in the display screen. By displaying the transition screen, users can intuitively understand the association between the objects contained in the current display screen and the objects contained in the after-changing large screen. Such a displaying of a transition screen by the display control unit 17, and the after-changing display mode will be explained with concrete examples in "3. Exemplary screen displays" described later.

In the case of a middle size (S125/Middle), the display control unit 17, in step S131, changes each object contained in the display screen to be output into a layout for a middle screen, in other words, a display mode for a middle screen. On this occasion, the display control unit 17 may perform such control as to display on the output target a transition screen (animation) that shows the changing of the display mode of each object contained in the display screen.

On the other hand, in the case where the display area of the output target is not larger than the area of the current display area (S112/No), the display control unit 17, in step S136, judges whether the display area of the output target is the same size as the current display screen, or a small size. Whether or not to be a small size may be judged by whether or not a previously set small size (for example, size below the first threshold value) is applicable.

Subsequently, in the case of a small size (S136/Small), the display control unit 17, in step S139, changes each object contained in the display screen to be output into a layout for a small screen, in other words, a display mode for a small screen. On this occasion, the display control unit 17 may perform such control as to display on the output target a transition screen (animation) that shows the changing of the display mode of each object contained in the display screen.

In the case of the same size (S136/Same), the display control unit 17, in step S142, controls each object contained in the display screen to be output so as to keep the same layout as the current display screen, in other words, not to change the display mode of each object.

Then, the above steps S106 to S142 are repeated until an end instruction of the image output is given in step S145.

So far, the display control processing according to the embodiment has been explained concretely. Next, the above-described displaying of the transition screen by the display control unit 17 and changing of the display mode of each object contained in a display screen will be explained in detail with a plurality of concrete examples. Here, all the concrete examples that will be explained below are examples of display control in the case where the display area of the output target is larger than the area of the current display screen (the above S112/Yes).

<<3. Exemplary Screen Displays>>

<3-1. First Exemplary Screen Display>

In the exemplary screen display, assuming that the display area of the output target is larger than the area of the current display screen, the display control unit 17 changes the display mode such that the initial screen contains multiple classes of functions, and thereby increases the amount of the information of the initial screen. The display control unit 17 may control an increasing amount of the information depending on whether the display area of the output target is a middle size or a large size. Thereby, when the display screen is output to a larger display area, the display mode is changed such that the initial screen contains more functions, that is, the number of icons (items) indicating menu functions is increased. Therefore, users can get to their intended functions directly or by fewer selecting operations.

Furthermore, in order not to confuse users, the display control unit 17 may perform such display control as to show the association between the icons contained in the current display screen and the icons contained in the after-changing display screen.

For example, as shown in FIG. 1, when the menu screen 30 that is displayed on the display unit 19 of the digital camera 1 is output to the tablet computer 2, the menu screen 30 is changed into the menu screen 45, and the number of icons is increased. The icon group 46*a* in the menu screen 45 indicates subclass functions of the menu item 31*a* in the menu screen 30, and the icon group 46*c* in the menu screen 45 indicates subclass functions of the menu item 31*c* in the menu screen 30. Such association between the before-changing icons and after-changing icons can be shown by matching relative display positions on the screen of the after-changing icon groups to display positions of the before-changing menu items. In addition, in the embodiment, the association may be shown by an animation expressing the progress of the screen changing. A case of displaying the animation expressing the progress of the screen changing will be concretely explained below with reference to FIG. 5.

FIG. 5 is a transition diagram for explaining the first exemplary screen display according to the embodiment. First, as shown in the FIG. 5, the display control unit 17 performs such control as to display a display screen 42 on the display unit 25 of the tablet computer 2, which is the display area of the output target. The display screen 42 is a screen on which the menu screen 30 (see FIG. 1) of the digital camera 1, which is the current display screen, is displayed in an enlarged size.

Next, as shown in a display screen 44 of FIG. 5, the display control unit 17 displays an animation in which the displays of menu items 43a to 43e gradually become pale and fade out, while icons indicating renewed functions gradually appear. The renewed icons indicate subclass functions of the menu items 43a to 43e. As for a menu item having no subclass (for example, a menu item 43b), as shown in the display screen 44 of FIG. 5, the size of the menu item is adjusted such that an icon with a similar size to the other renewed icons is displayed.

Then, as shown in FIG. 5, the display control unit 17 displays the menu screen 45 (display screen) that contains the newly appeared icon groups 46a, 46c, 46d and 46e, and icon 46b.

Thus, in the embodiment, by showing the screen changing caused by the changing of the display mode as the animation, it is possible to show which of the menu items is associated with the increased icons contained in the after-changing screen.

<3-2. Second Exemplary Screen Display>

In above-described first screen display, the animation in which the menu items 43a to 43e fade out at the same time, and the icons indicating the subclass functions of the menu items appear at the same time, is displayed. However, in the embodiment, an animation expressing the screen changing is not limited to this. For example, the display control unit 17 according to the embodiment may display an animation in which the menu items 43a to 43e sequentially fade out with the appearance of the icons indicating the subclass functions. An animation expressing a process in which the menu items 43a to 43e are sequentially changed will be concretely explained below with reference to FIG. 6.

FIG. 6 is a transition diagram for explaining a second exemplary screen display according to the embodiment. As shown in FIG. 6, the display control unit 117 sequentially changes the display modes of the menu items contained in the display screen that is displayed on the display unit 25 of the tablet computer 2, which is the display area of the output target. More concretely, for example, the display control unit 17 firstly performs such display control that the menu item 43a contained in a display screen 47 fades out, and the icon group 46a indicating the subclass functions of the menu item 43a appears.

Next, as shown in a display screen 48 of FIG. 6, the display control unit 17 changes the display mode of the menu item 43b. Since the menu item 43b is an item with no subclass, the display control unit 17 performs such control that the menu item is adjusted in size to be changed into the icon 46b with a similar size to the other newly appeared icons.

Subsequently, as shown in a display screen 49 of FIG. 6, the display control unit 17 performs such display control that the menu item 43c fades out, and the icon group 46c indicating the subclass functions of the menu item 43c appears. Then, the display control unit 17 also changes the display mode of the menu item 43d, similarly.

Finally, as shown in a display screen 50 of FIG. 6, the display control unit 17 performs such display control that the menu item 43e fades out, and the icon group 46e indicating the subclass functions of the menu item 43e appears.

Thus, in the embodiment, by sequentially changing the display modes of the menu items, it is possible to more clearly show which of the menu items is associated with the increased icons contained in the after-changing screen.

<3-3. Third Exemplary Screen Display>

In the above-explained first and second exemplary screen displays, by displaying the animation expressing the progress of the screen changing, which of the menu items is associated with the increased icons contained in the after-changing screen is shown. However, in the embodiment, a method to clearly show the association is not limited to this. For example, in the embodiment, the association between the increased icons contained in the after-changing screen and the before-changing menu items may be clearly shown by unifying the shape of the objects. Concrete explanations will be made below with reference to FIG. 7.

FIG. 7 is a diagram for explaining a third exemplary screen display according to the embodiment. As shown in FIG. 7, menu items 34a to 34e contained in a menu screen 33 (current display screen) displayed on the digital camera 1 side are shown in different shapes from each other. In this case, the display control unit 17, when outputting the menu screen 33 to the tablet computer 2, changes the display mode of each menu item 34 to output icons that indicate the subclass functions of the menu item 34 and have the same shape as the associated menu item 34.

Therefore, as shown in FIG. 7, on the tablet computer 2 side, icon groups 52a, 52c, 52d and 52e, and an icon 52b that have the same shapes as the respectively associated menu items 34a to 34e, are shown in a menu screen 51.

Thus, in the embodiment, it is possible to clearly show the association between the increased icons contained in the after-changing screen and the before-changing menu items, by unifying the shape of the objects.

<3-4. Fourth Exemplary Screen Display>

In the above third exemplary screen display, the association between the increased icons contained in the after-changing screen and the before-changing menu items are clearly shown by unifying the shape of the objects. However, the embodiment is not limited to this, and the association may be clearly shown, for example, by unifying the color of the objects. Concrete explanations will be made below with reference to FIG. 8.

FIG. 8 is a diagram for explaining a fourth exemplary screen display according to the embodiment. As shown in FIG. 8, menu items 37a to 37e contained in a menu screen 36 (current display screen) displayed on the digital camera 1 side are shown in different colors from each other. In this case, the display control unit 17, when outputting the menu screen 36 to the tablet computer 2, changes the display mode of each menu item 37 to output icons that indicate the subclass functions of the menu item 37 and have the same color as the associated menu item 37.

Therefore, as shown in FIG. 8, on the tablet computer 2 side, icon groups 55a, 55c, 55d and 55e, and an icon 55b that have the same colors as the respectively associated menu items 37a to 37e, are shown in a menu screen 54.

Thus, in the embodiment, it is possible to clearly show the association between the increased icons contained in the after-changing screen and the before-changing menu items, by unifying the color of the objects. In the embodiment, besides by the unity of color, the association may be clearly shown by the unity of pattern.

<3-5. Fifth Exemplary Screen Display>

In the above-described first to fourth exemplary screen displays, in the case where the display area of the output target is larger than the area of the current display screen, the amount of the information in the initial screen is increased, by changing the display mode such that multiple classes of functions are contained in the initial screen, in other words, increasing the number of icons (menu items) indicating menu functions. However, in the embodiment, a method to increase the amount of the information in the initial screen is not limited to the method by increasing the number of icons described above.

For example, it is allowable to change an image of each menu item (icon) displayed on the screen into an image that contains the displays of the items indicating the subclass functions. Such an icon image, which contains the displays of the subclass functions, enables the degree of detail of information to be increased without changing the number of icons, and users can easily understand which menu item should be selected in order to get to their intended functions. Concrete explanations will be made below with reference to FIG. 9.

FIG. 9 is a diagram for explaining a fifth exemplary screen display according to the embodiment. As shown in FIG. 9, when outputting the menu screen 30 (current display screen) displayed on the digital camera 11 side to the tablet computer 2 side, the display control unit 17 changes the display modes of the menu items 31a to 31e into display modes that show more detailed information (that have a more amount of information). Concretely, as shown in a menu screen 57 of FIG. 9, the display modes of the menu items 31a to 31e is changed into display modes of icons 58a, 58c, 58d and 58e that contain the displays of items 59a, 59c, 59d and 59e indicating the subclass functions, respectively.

Thus, in the embodiment, although the number of icons contained in the after-changing screen is unchanged from before the changing, it is possible to show more detailed information by changing the display mode of the icon into the display mode that contains the displays of the items indicating the subclass functions. Furthermore, together with each icon, the functions that are selectable on the subclass display screen displayed when the icon is selected, are clearly shown, and thereby users can easily understand which menu item should be selected in order to get to their intended functions.

<3-6. Sixth Exemplary Screen Display>

In the above-described first exemplary screen display, as shown in FIG. 5, the icon groups 46a, etc. that are changed into the display modes having a higher degree of detail of information, are each arranged at the positions corresponding to the display positions of the associated before-changing menu items 43a, etc. Thereby, users can intuitively understand the association between the after-changing icon groups and the before-changing menu items. However, in the case where the after-changing menu screen contains many icons, at which position the icon group that an icon belongs to is arranged, becomes unclear. Hence, in the embodiment, in response to a user operation, display control is performed by which the arrangement position of the icon group that a designated icon belongs to is shown, and thereby it is possible to dearly show the association between the after-changing icon groups and the before-changing menu items. Concrete explanations will be made below with reference to FIG. 10.

FIG. 10 is a transition diagram for explaining a sixth exemplary screen display according to the embodiment. As shown in FIG. 10, a menu screen 60 output from the digital camera I to the tablet computer 2 has been changed into the display mode with a higher degree of detail of information, and contains icon groups 61a, 61c, 61d and 61e, and an icon 61b. As shown in FIG. 10, in the icon groups 61a, etc., the outlines are blurred.

It is not clear which icon group of an icon group 61a and icon group 61c an icon 610 contained in the menu screen 60 belongs to. In this case, users operate the operation input unit 14 of the digital camera 1 and moves a cursor (not shown) displayed on a menu screen onto the icon 610. In response to such a user operation, as shown in the menu screen 63 of FIG. 10, the display control unit 17 performs such display control as to emphasize on the outlines of the icon group 61c that the icon 610 belongs to. Thereby, users find that the icon 610 belongs to the icon group 61c arranged at the center of the bottom of the screen, and can understand the association with a menu item arranged at the center of the bottom of the before-changing screen (for example, the menu item 31c of FIG. 1).

Thus, in the embodiment, the icon groups 61a, etc. contained in the after-changing screen are displayed with the outlines being blurred, and the icon group that an icon designated by users belongs to is displayed with the outlines being emphasized. Thereby, it is possible to clearly show which icon group each icon belongs to. Here, in an example in FIG. 10, which icon group each icon belongs to is clearly shown by the blurring and the emphasis on the outline. However, a dearly showing method according to the embodiment is not limited to this. For example, the display control unit 17 may clearly show it by performing such display control as to move icon groups, for example, to swing only the icon group that a designated icon belongs to.

<3-7. Seventh Exemplary Screen Display>

In the above-described first and second exemplary screen displays, the animation expressing the progress of the screen changing is displayed when the display screen is output. However, in the embodiment, the timing for displaying the animation is not limited to this, and for example, the displaying may be triggered by a user operation. Concrete explanations will be made below with reference to FIG. 11.

FIG. 11 is a transition diagram for explaining a seventh exemplary screen display according to the embodiment. As shown in FIG. 11, a menu screen 65 that has been output to, for example, the tablet computer 2 and has been changed into the display mode with a higher degree of detail of information, contains a composing button 66 in addition to the icon groups 46a, 46c, 46d and 46e, and the icon 46b.

When the composing button 66 is selected by a user operation, the display control unit 17 displays an animation expressing the progress of a screen changing for returning the display modes of the objects (the icon groups 46a, etc) contained in a menu screen 65 to the display modes with a lower degree of detail of information, Concretely, by the display control unit 17, as shown in a menu screen 68 of FIG. 11, the icon groups 46a, 46c, 46d and 46e gradually become small, while the menu items 43a, 43c, 43d and 43e fade in. The menu items 43a, 43c, 43d and 43e indicate the upper class functions of the icon groups 46a, 46c, 46d and 46e, respectively. Here, since the icon 46b is a mono-class, the display control unit 17 adjusts and changes the size of the icon 46b into a similar size to the other menu items 43a, etc.

In the following, the icon 46*b* whose size is changed in this manner will be referred to as a menu item 43*b*.

Then, as shown in FIG. 11, after the animation (menu screen 65) expressing the progress of the screen changing is displayed, a menu screen 70 changed into the display mode with a lower degree of detail of information (with the fewer number of icons) is displayed.

Thus, the displaying of the animation expressing the progress of the screen changing and returning to the previous display mode, which are triggered by a user operation, make it possible to clearly show which menu item is associated with the increased icons.

As shown in FIG. 11, the menu screen 70 contains a decomposing button 71 in addition to the menu items 43*a*, 43*b*, 43*c*, 43*d* and 43*e*. The decomposing button 71 is an operation button for a returning to the menu screen 65 that has the display mode with a higher degree of detail of information.

When the decomposing button 71 is selected by a user operation, the display control unit 17 displays an animation expressing the progress of a screen changing for changing the display modes of the objects (menu items 43*a* to 43*e*) contained in the menu screen 70 into the display modes with a higher degree of detail of information. Concretely, as shown in a menu screen 72 of FIG. 11, the display control unit 17 displays the animation in which the displays of menu items 43*a* to 43*e* gradually become pale and fade out, while the icon groups 46*a*, 46*c*, 46*d* and 46*e*, and the icon 46*b* gradually appear.

Thus, the display control unit 17 can again change the display screen returned to the display mode with a lower degree of detail of information into the display mode with a higher degree of detail of information, which is triggered by a user operation. On this occasion, again, the animation expressing the progress of the screen changing is displayed, and thereby, users can intuitively understand the association between the menu items before changing the display mode and the increased icons after the changing.

(Supplementation)

So far, examples of the screen display according to the embodiment have been concretely explained with the first to seventh exemplary screen displays. Examples of the screen display according to the embodiment may include an appropriate combination of the above-described exemplary screen displays.

For example, the display control unit 17 may apply the displaying of the animation expressing the progress of the screen changing, explained in the first and second exemplary screen displays, when outputting the screen to the tablet computer 2 side in the third to sixth exemplary screen displays. In addition, it is allowable to combine the third and fourth exemplary screen displays, and clearly show the association between the increased icons contained in the after-changing screen and the before-changing menu items, by unifying the shape and color of the objects.

21 <4. Conclusion>>

As described above, in the display control according to the embodiment, depending on the display area of an output target, each object contained in a display screen to be output is changed into a display mode that differs in the degree of detail of information from a display mode of each object contained in a current display screen. Concretely, for example, in the case where the display area of the output target is larger than the display area of the current display screen, each object contained in the display screen to be output is changed into a display mode with a higher degree of detail of information, and thereby the large display area can be effectively utilized. The display mode with a higher degree of detail of information may be a mode in which a single icon (menu item) is decomposed to multiple icons indicating subclass functions and the number of icons is increased. Furthermore, the display mode with a higher degree of detail of information may be a display mode in which a single icon (menu item) is changed into a single icon that contains the displays of multiple items indicating subclass functions and the number of icons is neither increased nor decreased.

Also, in the embodiment, it is possible to show a screen changing caused by changing a display mode as an animation, and thereby clearly show which of menu items before changing the display mode is associated with icons increased after changing the display mode.

It should be understood by those skilled in the art that various modifications, combinations, sub-combinations and alterations may occur depending on design requirements and other factors insofar as they are within the scope of the appended claims or the equivalents thereof.

The present technology may also be configured as below.

(1)

A display control device including:

an output unit to externally output a display screen; and a display control unit to perform control on an object contained in the display screen that is externally output in a manner that the object contained in the display screen is changed to be displayed in a second display mode that differs from a first display mode of a current object contained in a current display screen in a degree of detail of information.

(2)

The display control device according to (1), further including:

a comparison unit to compare a size of a display area of an output target with a size of the current display screen, wherein, as a result of comparison, when the display area of the output target is larger than an area of the current display screen, the display control unit changes the object contained in the display screen that is externally output in a manner that the object contained in the display screen is displayed in the second display mode, and has a higher degree of detail of information than the object contained in the current display screen.

(3)

The display control device according to (2), the object in the second display mode is displayed as a single icon that contains display of a single or multiple items each of which indicates a subclass function of the object contained in the current display screen.

(4)

The display control device according to (2), the object in the second display mode is displayed as a single or multiple icons each of which indicates a subclass function of the object contained in the current display screen.

(5)

The display control device according to any one of (1) to (4), wherein the display control unit performs display control in a manner that a display position of the object in the display screen that is externally output corresponds to a display position of the object in the current display screen.

(6)

The display control device according to any one of (1) to (5), wherein the display control unit performs control in a manner that a transition screen is displayed when the object in the display screen that is externally output is changed to be displayed in from the first display mode to the second display mode.

(7)

The display control device according to (6), wherein the display control unit performs control in a manner that the transition screens for a plurality of the objects are sequentially displayed per object.

(8)

The display control device according to any one of (1) to (7), wherein the display control unit performs control in a manner that a color or a shape of the object in the display screen that is externally output corresponds to a color or a shape of the object in the current display screen.

(9)

The display control device according to any one of (1) to (8), wherein the display control unit performs display control in a manner that, in the display screen that is externally output, an icon group to which an icon belongs is clearly shown by emphasis on an outline or synchronous control on a motion, the icon being designated by a user.

(10)

The display control device according to any one of to (9), wherein the display control unit performs display control in a manner that, in the display screen that is externally output, the object displayed in the second display mode returns to be displayed in the first display mode in response to a user operation.

The display control device according to (1), further including:

a comparison unit to compare a size of a display area of an output target with a size of the current display screen, wherein, as a result of comparison, when the display area of the output target is smaller than an area of the current display screen, the display control unit changes the object contained in the display screen that is externally output in a manner that the object contained in the display screen is displayed in the second mode, and has a lower degree of detail of information than the corresponding object in the current display screen.

(12)

A display control method including:

changing an object contained in a display screen that is externally output in a manner that the object contained in the display screen is displayed in a second display mode that differs from a first display mode of the object contained in a current display screen in a degree of detail of information; and externally outputting the display screen that contains the object changed to be displayed in the second display mode.

(13)

A program for causing a computer to function as:

an output unit to externally output a display screen; and a display control unit to control an object contained in the display screen that is externally output in a manner that the object contained in the display screen is changed to be displayed in a second display mode that differs from a first display mode of the object contained in a current display screen in a degree of detail of information.

REFERENCE SIGNS LIST 1 digital camera
10 CPU
11 ROM
12 RAM
13 camera module
14 operation input unit
16 storage medium
17 display control unit
18 comparison unit
19 display unit
20 external I/F
2 tablet computer
25 display unit
30, 33, 36, 45, 51, 54, 57, 65, 68, 70, 72 menu screen
31a to 31e, 34a to 34e, 37a to 37e, 43a to 43e menu item
46a, 46c to 46e, 52a, 52c to 52e, 55a, 55c to 55e, 61a, 61c to e icon group
46b, 52b, 55b, 58a to 58e, 61b, 610 icon
66 composing button
71 decomposing button

The invention claimed is:

1. A display control device, comprising:
a controller configured to:
determine a first plurality of levels in a hierarchy based on a first display area of a first display screen and a second display area of a second display screen;
control display of a first object on the first display screen and a second object on the second display screen,
wherein the second object on the second display screen is associated with the first object on the first display screen; and
control display of transition content on the second display screen,
wherein the display of the transition content is controlled based on a comparison of the first display area and the second display area,
wherein the transition content shows an association between the first object on the first display screen and the second object on the second display screen, and
wherein the transition content shows content that is in an intermediate display mode between a first display mode of the first object and a second display mode of the second object.

2. The display control device of claim 1,
wherein the first object on the first display screen is at a higher level in the hierarchy than a plurality of objects displayed on the second display screen, and
wherein the first object on the first display screen corresponds to the plurality of objects displayed on the second display screen.

3. The display control device of claim 1, wherein the second object on the second display screen is at a lower level in the hierarchy than the first object on the first display screen.

4. The display control device of claim 1, wherein the controller is further configured to increase an amount of information displayed on the second display screen, wherein the amount of information is increased based on the second display area of the second display screen that is larger than the first display area of the first display screen.

5. The display control device of claim 1, wherein the controller is further configured to adjust a size of the first object on the first display screen.

6. The display control device of claim 1, wherein the first object displayed on the first display screen is of a topmost level in the hierarchy.

7. The display control device of claim 1, wherein the controller is further configured to control display of third objects of a second plurality of levels in the hierarchy on the second display screen.

8. The display control device of claim 1, wherein an amount of information displayed on the second display screen is based on display information of the second display screen.

9. The display control device of claim 8, wherein the display information includes the second display area of the second display screen.

10. The display control device of claim 1, further comprising:
a first display device including the first display screen, wherein the second display screen is included in a second display device external to the first display device.

11. The display control device of claim 1, wherein the controller is further configured to control concurrent display of the first object on the first display screen and the second object on the second display screen.

12. The display control device of claim 1, further comprising an imaging element.

13. The display control device of claim 1, wherein the controller includes a processor.

14. The display control device of claim 1, wherein the controller is further configured to control the display of the first object and the second object such that a fade out of the first object on the first display screen and an appearance of the second object on the second display screen occur concurrently.

15. The display control device of claim 1, wherein the first object on the first display screen and the second object on the second display screen have a same shape.

16. The display control device of claim 1, wherein the first object on the first display screen and the second object on the second display screen have a same color.

17. The display control device of claim 1, wherein the second object on the second display screen is displayed within a third object corresponding to the first object on the first display screen.

18. A display control method, comprising:
determining, by a processor, a first plurality of levels in a hierarchy based on a first display area of a first display screen and a second display area of a second display screen;
controlling, by the processor, display of a first object on the first display screen and a second object on the second display screen,
wherein the second object on the second display screen is associated with the first object on the first display screen; and
controlling display of transition content on the second display screen,
wherein the display of the transition content is controlled based on a comparison of the first display area and the second display area,
wherein the transition content shows an association between the first object on the first display screen and the second object on the second display screen, and
wherein the transition content shows content that is in an intermediate display mode between a first display mode of the first object and a second display mode of the second object.

19. A non-transitory computer-readable medium having stored thereon, computer executable instructions for causing a computer to execute operations, the operations comprising:
determining a first plurality of levels in a hierarchy based on a first display area of a first display screen and a second display area of a second display screen;
controlling display of a first object on the first display screen and a second object on the second display screen,
wherein the second object on the second display screen is associated with the first object on the first display screen; and
controlling display of transition content on the second display screen,
wherein the display of the transition content is controlled based on a comparison of the first display area and the second display area,
wherein the transition content shows an association between the first object on the first display screen and the second object on the second display screen, and
wherein the transition content shows content that is in an intermediate display mode between a first display mode of the first object and a second display mode of the second object.

* * * * *